No. 752,764. PATENTED FEB. 23, 1904.
L. DUNNE.
WINDMILL.
APPLICATION FILED SEPT. 11, 1903.
NO MODEL. 2 SHEETS—SHEET 1.
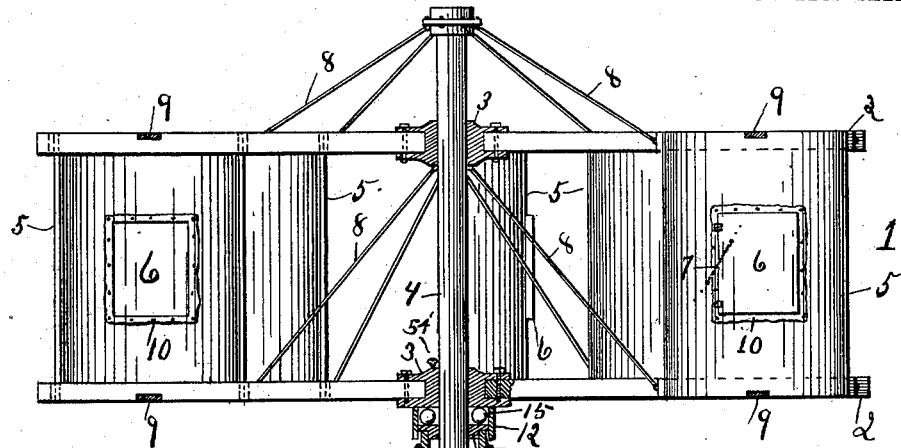
Fig.1.
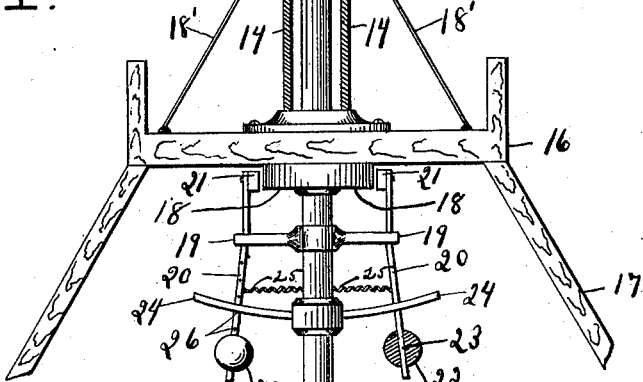
Fig.1A.
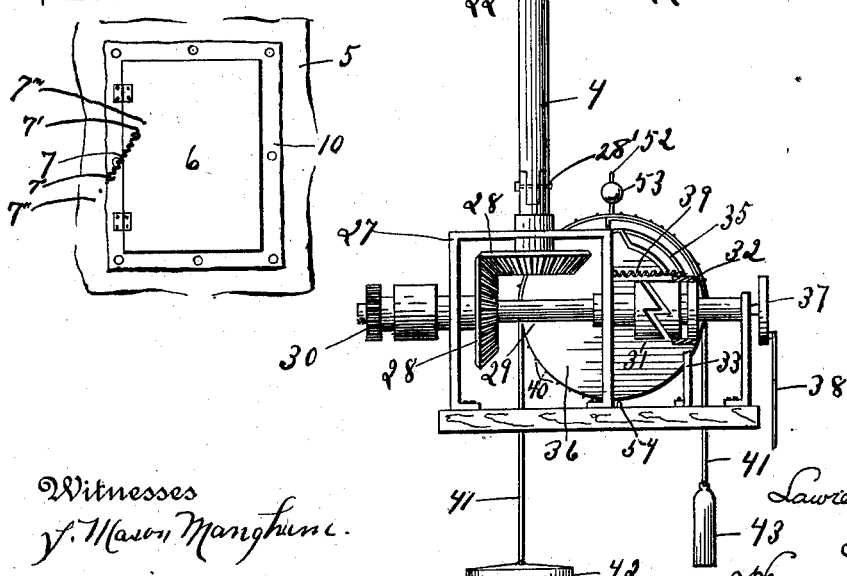
Witnesses
Inventor
Lawrence Dunne No. 752,764. PATENTED FEB. 23, 1904.
L. DUNNE.
WINDMILL.
APPLICATION FILED SEPT. 11, 1903.
NO MODEL. 2 SHEETS—SHEET 2.
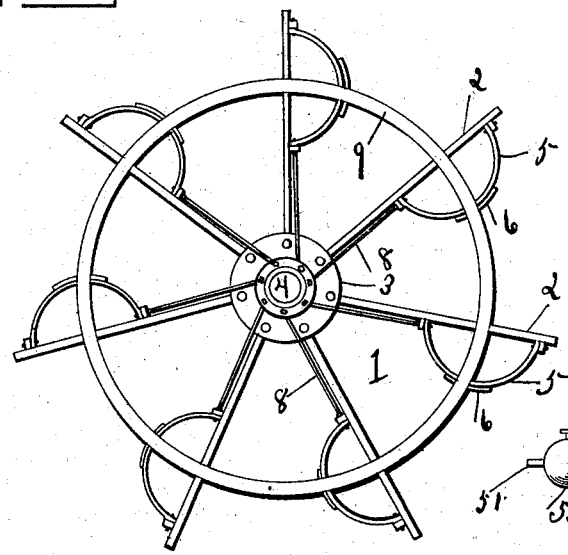
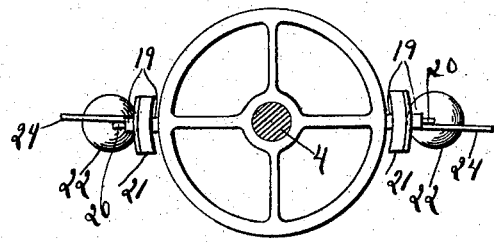
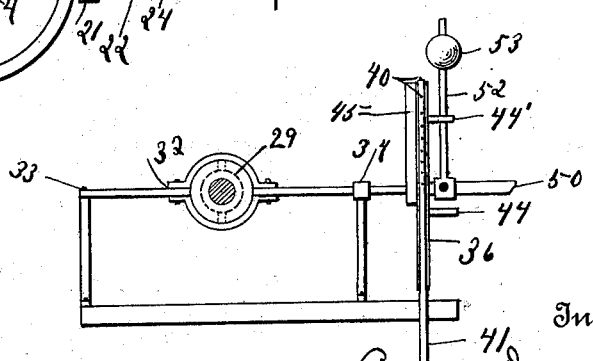
Witnesses
J. Mason Marghum.
Grenville S. Millard.
Inventor
Lawrence Dunne
By Hensey & Lough Attorneys
THE NORRIS PETERS CO., PHOTO-LITHO., WASHINGTON, D. C.

No. 752,764. Patented February 23, 1904.

UNITED STATES PATENT OFFICE.

LAWRENCE DUNNE, OF MONTGOMERY, ALABAMA.

WINDMILL.

SPECIFICATION forming part of Letters Patent No. 752,764, dated February 23, 1904.

Application filed September 11, 1903. Serial No. 172,773. (No model.)

*To all whom it may concern:*

Be it known that I, LAWRENCE DUNNE, a citizen of the United States, residing at Montgomery, in the county of Montgomery and State of Alabama, have invented certain new and useful Improvements in Windmills, of which the following is a specification, reference being had to the accompanying drawings.

This invention has relation to windmills;
and it consists in the novel construction and arrangement of its parts, as hereinafter shown and described.

The object of my invention is to provide a windmill adapted to operate in winds of various velocity and automatically control itself in violent storms and to perform work at a stated velocity of the wind.

The further object of the invention is to provide a windmill which is not likely to be blown down during storms and one that having a given diameter has great power. The mill is provided with a minimum number of frictional parts and requires no tails, rudders, ropes, or chains, or weights to carry it over or past dead-centers. It requires no pulling out of the wind in an effort to save it from the effects of storm. It cannot be affected by rain, snow, or freezing weather. It can be erected in any convenient place, and it is not necessary to erect it over wells for pumping purposes. It will operate in storms as well as in winds of lesser velocity. It is simple in construction, light in weight, powerful in its action, and its power may be increased or decreased without changing its diameter. It will operate machinery and pump at the same time without one operation interfering with the other. It is provided with a governor or regulator which cannot be affected by the weather. As it always faces the wind, it cannot be taken at a disadvantage at any time, no matter how sudden or how violent the wind may strike it from any point. It moves with the wind at all times.
In the accompanying drawings, Figure 1 is a side elevation of the windmill, partly in section. Fig. 1$^A$ is an enlarged view of the valve of a sail, showing the spring-controlling mechanism. Fig. 2 is a top plan view of the windmill. Fig. 3 is a side elevation of a float-wheel with a switching mechanism for operating the lever for interrupting or transmitting motion to the pump-rod. Fig. 4 is a top plan view of a governor used on the windmill, and Fig. 5 is an edge view of the device as shown in Fig. 3.

Referring to the drawings, the double wheel 1 consists of two sets of arms or spokes 2 2, resting firmly in the hubs 3 3' and which are firmly secured to the shaft 4. The semi-circular sails 5 have hinged valves 6, which are controlled by springs 7 or any other suitable device. The sails 5 are mounted on the wheels 1 in vertical positions, the concave surface of each sail facing the convex surface of the one immediately preceding. The brace 8 supports the arms of the wheel 1, on which the sails are mounted, and the bands 9 are for the purpose of insuring the stability of the wheel and also assist in maintaining the sails in a vertical position. The force of the wind being greater on the concave than on the convex surface of the sails, the wheel is compelled to revolve in a horizontal plane and always in the same direction. The valves 6 in the sails 5 are hung to one side of the openings in the sails, said openings being cushioned with suitable material 10 to deaden any noise made as the valves are closed. The opening and closing of the valves are controlled by springs 7 or any other suitable device, so that they may be set for any amount of pressure on the valves in their opening and closing. The springs 7 are provided at their ends with the pins 7', which are adapted to enter the perforations 7'' and 7''' in the sails 5 and the valves 6, respectively. Thus by elongating or contracting the said springs by adjusting the pins in different perforations the tension of the said spring may be regulated, or any other form of spring provided with a means for adjusting the tension thereof may be employed. These valves being acted upon by the force of the wind will be automatically opened and closed by that force when it overbalances the force for which the springs 7 were set. The object of this is to relieve the pressure of the wind on the sail, and thereby retard or check the speed of the wheel whenever the velocity of the wind reaches a stage that would be considered dangerous in operating machinery that might be in connection with the main shaft 4. For instance, assume that the valve-springs are set for a forty-mile wind per hour. As soon as the wind has reached that velocity the valves of the sails coming into the wind are caused to open by the force of the wind overbalancing the valve-springs. A certain amount of the wind force is lost by the fact of its passing through the said openings, and thereby the speed of the wheel is reduced as the convex surface of the sails turns out of the wind and presents its concave surface, the springs acting on the valves, as well as the pressure of the wind, causing them to close. This action insures greater sensitiveness to the wheel to perform work in very light winds. The hub 3' of the lower arms of the wheel 2 has a flange or hood 12 extending a short distance below its bearings on the bed-plate 13 of the standard 14, this flange or hood being for the purpose of protecting the bearings from snow, hail, or rain. The said hub rests on ball-bearings 15, thereby reducing friction to a minimum. The standard 14 is a tube firmly secured to a platform 16 of the tower 17, and the braces 18' maintain it in a perpendicular position. The shaft 4 passes through the standard 14 and is free to revolve therein and may be carried to any convenient distance below the platform 16. The brake-wheel 18 of the governor or regulator is bolted to the under surface of the platform 16 with the shaft 4 passing through its center. The arms 19, two or more being used, are firmly secured to the shaft 4. On these arms are hung loosely the rods 20, which carry at their upper ends the brake-shoes 21 and at their lower ends the balls 22. The balls are made adjustable on the rods 20 by means of set-screws 23 or other devices, the curved guides 24 being for the purpose of keeping the rods 20 from swinging out of position. The springs 25 are intended to regulate the centrifugal force of the balls 22. The function of this construction is to reduce the speed of the power-wheel without bringing it to a standstill and acts in conjunction with the sail-valves. The rods 20 are graduated, as at 26, for certain velocities of wind. Thus the balls may be set for different velocities and cause the brake to act on the brake-wheel as the wind reaches the velocity for which each ball may be set. In this way the speed of the wheel may be maintained at any desired velocity of wind and transmit only the power due to that velocity, even though the wind has increased to twice or more than the velocity for which the governor or regulator has been set. For example, assume that the mill has been set to transmit only the power due to a forty-mile wind per hour. Should the velocity increase to the rate of fifty, seventy, eighty, or more miles per hour, the brakes, having been previously set for such contingencies, act as these velocities may be reached, and the speed of the wheel is still maintained to work at the forty-mile rate and no more. When the wind falls below the rate of forty miles, the brakes are taken off automatically by the balls falling into their normal position, and the springs 25 hold them in that position, as well as assisting in regulating the centrifugal force, and no velocity under the forty-mile rate can cause the regulator to act unless it is so set.

In order to make use of the power of the wind-wheel in operating machinery, I devise and adopt the following means: In the frame 27 are mounted bevel-wheels 28 28, one of which is mounted and secured firmly to the shaft 4 by means of the coupling 28' and the other on the shaft 29. On said shaft 29 may be mounted gear-wheels or pulleys 30 for the purpose of connecting with and transmitting motion to other machinery. The coupling-clutch 31 is also mounted on this shaft 29. The clutch-lever 32 is pivoted at 33 and passes through a guide 34, with its end engaged with the switch 35 on the wheel 36. On the outer end of the shaft 29 is secured a crank-wheel 37 or any other suitable device for connecting with the pumping-rod 38. One end of the spring 39 is connected with the frame 27 and the other to the clutch-lever 32, its purpose being to keep the two parts of the clutch 31 united while pumping is going on.

In order to regulate the stage of water in tanks, cisterns, &c., I attain this object by the following means: The float-wheel 36 has teeth 40 on its periphery for the purpose of engaging the sprocket-chain 41, which connects the float 42 with the counterbalance 43. The wheel 36 has also two studs 44 44' and also carries the guide 45, which is firmly secured to the wheel. The switch 35 is pivoted at 46 within the guide 45, the said guide having an incline at 47 near the free end of the switch 35. The spring 48 acts on the switch 35, keeping its free end pressed against the upper part of the incline 47 and on a level with the portion 49, extending a short space beyond. One end of the lever 32 of the clutch 31 is engaged with the switch at its pivoted end 46 and in a line parallel with the axle of the wheel 36. The wheel 36 is mounted loosely on its axle 50, to which axle is journaled two rods 51 52, carrying the balls 53, which are made adjustable on the rods by means of thumb-screws or any other device suitable. The limit-stud 54 is set in the frame 27 and sufficiently high to meet the two outer teeth 40 on the periphery of the wheel 36. The range of movement of this wheel is therefore confined to the limits of that quadrant of the wheel having no teeth on its periphery. The operation of this construction for controlling the stage of water in tanks, cisterns, &c., when connected for pumping purposes is as follows: One end of the arm of the clutch-lever 32 being engaged with the switch 35 at its pivoted end 46, the clutch 31 has its members united or closed and the shaft 29 in motion, the float 42 resting on the water. As the float 42 rises in the tank (not shown) it gives motion to the wheel 36. When the stud 44 on the wheel reaches that rod 51 carrying the balls 53, the wheel 36 and axle 50 then move together, carrying the balls 53 with them. When the inclined portion 47 of the guide 45 arrives at the end of the clutch-lever 32, (which is resting in a line parallel with the axle 50,) the lever 32 is forced outward—that is, from the center of the wheel 36—in passing up the incline 47. This causes the switch 35 to open, and when the lever 32 has very nearly passed through the opening thus made the balls 53 have reached a position that one overbalances the other, and the arm 52, falling on the stud 44', suddenly drives the wheel 36 far enough forward to permit the lever-arm 32 to make its escape from the opening above described and clear the end of the switch 35, which immediately is forced back into its original place by the action of the spring 48. This action of the switch cuts off the return of the lever in the direction which it had traveled, and the lever 32 is therefore compelled to take the outside track of the switch 35 during the time the water is falling and when taking a retrograde movement. Thus the members of the clutch 31 are disunited during the falling of the water, and pumping ceases until the pivoted end of the switch 35 is brought to the lever-arm 32 by the retrograde motion. The balls 53 are then caused to act in a similar manner to that when pumping, but in the opposite direction. When the lever-arm has cleared the pivoted end of the switch 35, the clutch-spring 39, acting on the lever 32, draws the said lever into its first position. The clutch 31 is then closed and the pumping is resumed, so that the range of stage of water in tanks may be regulated at pleasure. The act of pumping being automatically controlled, in no manner interferes with the operation of other machinery at the same time. The shaft 4 may be divided into any number of sections to accommodate the height of towers.

54' is the oiler for the bearings of the power-wheel, it being the only one necessary.

Having thus described my invention, what I claim as new, and desire to secure by Letters Patent, is—

1. In a windmill, a set of radiating arms, a sail rigidly fixed to said arms, said sail having an opening, a spring-actuated valve hinged to the sail and adapted to cover the opening in the sail and a means for regulating the tension of the said spring.

2. A windmill consisting of upper and lower radiating arms, concaved sails interposed vertically between said arms, annular bands horizontally disposed and attached to the said arms and also to the ends of the sails.

3. In combination with a windmill, a means for automatically throwing the same in and out of gear consisting of a float-operated wheel having guides, a clutch having a lever entering the space between said guides.

4. In combination with a windmill adapted to be automatically thrown in and out of gear, a float-operated wheel having guides, a clutch having a lever entering the space between said guides and an appended switch located in said guides.

5. In combination with a windmill, a means for throwing same in and out of gear consisting of a float-operated wheel having guides, a clutch having a lever entering the space between said guides and a spring-actuated switch located within said guides.

6. In combination with a windmill, a means for throwing same in and out of gear consisting of a float-operated wheel having guides, a clutch having a lever entering the space between said guides and weighted arms concentrically pivoted with relation to said wheel and adapted to be operated by studs carried by said wheel.

In testimony whereof I affix my signature in the presence of two witnesses.

LAWRENCE DUNNE.

Witnesses:
DAVID W. W. FULLER,
J. W. BLACK.